Oct. 25, 1932.   B. J. JACOBSON   1,885,014
OPHTHALMIC MOUNTING
Filed Sept. 18, 1930

Inventor:
Bror J. Jacobson
By Pennington & White
Attorneys.

Patented Oct. 25, 1932

1,885,014

UNITED STATES PATENT OFFICE

BROR J. JACOBSON, OF WARWICK, RHODE ISLAND, ASSIGNOR TO MARTIN-COPELAND COMPANY, OF PROVIDENCE, RHODE ISLAND, A TRUSTEE-SHIP CONSISTING OF EDGAR W. MARTIN, LAURENCE C. MARTIN, AND GEORGE W. BLEECKER

OPHTHALMIC MOUNTING

Application filed September 18, 1930. Serial No. 482,786.

This invention relates to ophthalmic mountings, particularly for rimless eyeglasses and spectacles, and consists in an improved means for connecting the nosepiece or bridge and the temples to the lenses.

One object of the invention is to provide a mounting of the type specified having means for attaching the bridge, and in the case of spectacles, the temples, to the lenses without requiring an accurate location of the screwholes therein.

Another object of the invention is to provide a mounting of the type specified wherein the attaching-means has a resilient bearing on the edge of the lens to adapt it to adjust itself thereto under slight variations in the location of the screw-hole with respect to said edge.

Another object of the invention is to provide a mounting of the type specified wherein the resilient member which bears against the edge of the lens serves to maintain the connection firm and substantially rigid to prevent play and movement of the mountings with respect to the lenses.

Another object of the invention is to provide a mounting of the type specified in which the attaching-means is self-conforming to the edge or rim of the lens whatever the contour of the latter may be.

Another object of the invention is to provide a mounting of the type specified wherein the connecting-means is cushioned at its bearing on the edge of the lens to prevent shock or jar when the glasses are dropped or roughly handled whereby to avoid breakage of the lenses.

Another object of the invention is to provide a mounting of the type specified which is simple in construction, neat and finished in appearance, and generally more efficient for the purpose specified.

Further objects of the invention are set forth in the following specification which describes a preferred form of construction of the improved mounting as illustrated by the accompanying drawing. In the drawing.

In attaching the nose-piece or bridge to the lenses of rimless eyeglasses, and also in attaching the temples to the lenses of spectacles, it is customary to provide the same with straps straddling the opposite sides of the lenses and perforated with holes through which a screw is inserted to extend through a hole in the glass. Usually, the hole in one strap is threaded to engage the threads of the screw and arcuate-shaped shoes disposed between the straps engage against the edges of the lenses to prevent the mountings from turning on the screws. Great care is necessary in drilling the lenses for the holes which receive the screws and extreme accuracy is required in locating the holes with respect to the edges of the lenses in order that the mountings may fit properly with their shoes tight against the edges or rims of the lenses. The fittings or mountings for the eyeglasses are generally sold separately as findings and the work of attaching them to the lenses is done by the optician who fits the glasses to the eyes of the user. Opticians are not generally provided with precision instruments for the accurate and precise fitting of the mounting to the hole in the lens and it frequently happens that when the screw is inserted through the hole and tightened in place the lens is broken. It is therefore a principal object of the present invention to provide means for attaching the mountings to the lenses without necessitating such accurate location of the holes for the screws to secure a tight fit of the mountings against the rims of the lenses to prevent play or looseness.

To accomplish this result the present invention consists broadly in providing resilient means between the shoe on the mounting and the edge of the lens, which means is self-adjusting under variations in the location of the screw hole with respect to the edge of the lens, while at the same time acting to maintain a firm fit of the mounting on the lens. A preferred form of construction of the improved means is shown in the accompanying drawing and will be next described in detail.

Figure 1:
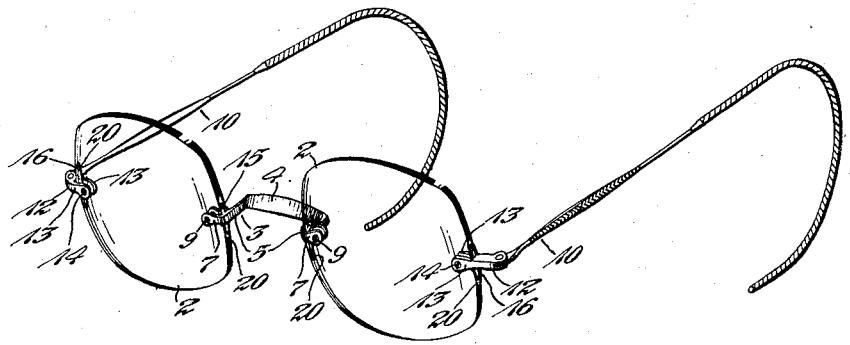
Fig. 1 is a perspective view illustrating a pair of rimless spectacles embodying the present improved mounting for attaching the bridge or nose-piece and the temples to the lenses.

Referring to Fig. 1 of the drawing, the pair of spectacles therein illustrated comprises lenses 2 of peculiar contour, their edges being of arcuate shape but not fully circular. Connecting the two lenses is the bridge or nose-piece 3 which is herein shown as having a curved crossbar 4 with opposite parallel arms 5 extending forwardly therefrom. At the ends of the arms 5 are right-angled portions terminating in opposite spaced straps 7 which overlap the sides of the lenses 2 and are secured thereto by means of screws 9 passing through holes in the glass.

Figure 4:
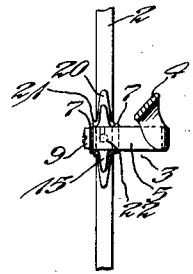
Fig. 4 is a side view of the mounting shown in Fig. 2 with the nose-piece or bridge illustrated in section in a medial vertical plane.

The temples 10 of the spectacles are attached to the outer rims of the lenses 2 in substantially the same manner, the mountings or end-pieces 12 having opposite straps 13 straddling the sides of the lenses 2 and secured thereto by screws 14. The present improved attaching-means is adapted for use with either type of mounting, Figs. 2, 3 and 4 illustrating it in detail as employed with the nose-piece or bridge.

Figure 5:
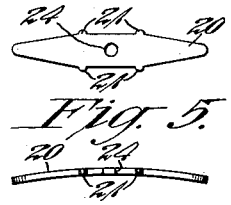
Fig. 5 is a plan view of the resilient shoe or spring element of the mounting.
Figure 6:
Fig. 6 is an edge view of the same.

The straps 7 at the ends of the arms on the sides of the nose-piece 3, and likewise the straps 13 on the end-pieces 12 of the temple-mountings, are provided with the usual rigid shoes 15 and 16, respectively, which are of arcuate shape extending in a direction generally at right-angles to the screws 9 and 14, or in a plane substantially coincident with the plane of the lenses. In the present improved mounting the distance between the shoe and the hole for the screw in the straps is made slightly longer than usual, and inserted between the shoe and the edge of the lens is a resilient auxiliary shoe or spring-member 20 shown in detail in Figs. 5 and 6. The auxiliary shoe or spring-member 20 conforms to the shape of the main shoe 15 in plan view, being slightly longer than the latter. Its ends are of generally pointed form with a straight portion at the center bounded by four lugs or protuberances 21 projecting from its edges. The straight central portion of the auxiliary shoe 20 is adapted to fit within the sides of the straps 7 abutting the inner face of the main shoe 15, and the lugs or protuberances 21 overlap the opposite edges of the straps to prevent the element 20 from sliding longitudinally or becoming displaced. The auxiliary shoe 20 is preferably made of spring steel or other suitable tempered metal and is of arcuate or bow-shape in edge view as illustrated in Fig. 6. In this way it is adapted to act as a leaf-spring with its concaved side arranged opposite the edge or rim of the lens 2 and its ends bearing thereagainst with a resilient pressure. The auxiliary shoe 20 may be made as a separate fitting and not permanently attached to the mounting, when so desired, but preferably it is fastened to the inner face of the main shoe 15 so that the several parts may be assembled and merchandised as a complete fitting.

Figures 2, 3:
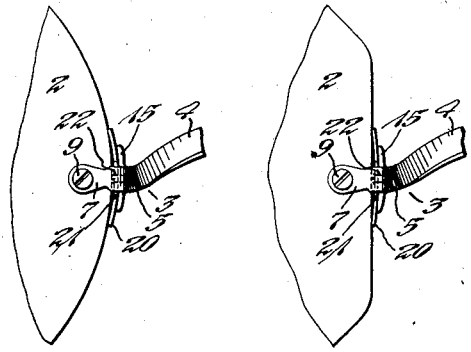
Fig. 2 is an enlarged fragmentary view of a lens of generally circular contour showing the present improved mounting applied to use therewith.
Fig. 3 is a similar enlarged view showing the mounting as applied to use with a lens of hexagonal contour.

As a convenient means for attaching the auxiliary shoe 20 to the mounting a stud or rivet 22 may be provided on the main shoe 15 for insertion into a central hole 24 in the member 20 as shown in Figs. 2 and 3, the stud being riveted over at its end to effect a permanent joinder of the parts.

It will be observed from the foregoing that the present improved construction of the mounting the nose-piece or the temple end-piece, as the case may be, is attached to the lens by simply sliding the straps 15 or 16 across the edges of the glass to overlap its sides and then inserting the screw 9 or 14 through the holes in the straps and the hole in the lens and tightening it in place in the usual manner. The parts are so proportioned that when the mounting is applied to the lens with the holes in the straps registering with the hole in the glass the auxiliary spring-shoe 20 will be compressed against the edge of the lens to insure a tight firm fit of the mounting thereon. The resilient pressure of the spring-shoe thereafter maintains the mounting substantially rigid without allowing it to play or turn about its fastening screw and the spring also provides a sort of cushion or shock-absorber to guard against breakage of the lenses if the glasses are roughly handled or dropped.

A particular feature of improvement as above noted resides in the fact that the mountings may be attached to the lenses without fitting or adjustment, for instance, by bending the rigid shoes as is usually required when the holes in the glass are not properly spaced from the edges to insure accurate register with the holes in the straps. It is therefore much easier and requires less skillful and careful work to attach the mountings and the danger of breaking the lenses is practically eliminated.

It has also been found that the resilient element of the mounting tends to maintain the fastening screw tight in the straps, thus preventing a loose and wabbly joint between the parts.

As another feature of the improvement, the mountings are adapted for use with various styles or shapes of lenses, the resilient shoe being self-conforming to the edge of the lens whether the contour of the side be curved or straight. The optician is therefore not required to carry a large stock of special fittings since the present mounting is adapted for practically all styles or rimless glasses.

The present mounting is exceedingly simple in structure and neat and finished in appearance, while being much more efficient in use for the reasons specified.

While I have herein described and illustrated the invention as embodied in a preferred form of construction, it is to be understood that various modifications may be made in the form and arrangement of the parts of the device without departing from the spirit or scope of the appended claims.

I claim:

1. An ophthalmic mounting for spectacles and eyeglasses comprising a member having means for fastening it to a lens and provided with an arcuate shoe having a curvature on its inside of less radius than the radius of the rim of the lens, and an arcuately-shaped spring of slightly greater length than the shoe adapted to be held under compression between the shoe and the edge of the lens, the shoe being of such length as to cause its ends to engage against the back of the spring at points adjacent the ends of the latter whereby to clamp the terminal portions of the spring against the edge of the lens to maintain the parts in rigid connection.

2. In an ophthalmic mounting for spectacles and eyeglasses, the combination with a lens, of a strap-member having means for fastening it to the lens and formed with a rigid shoe extending in spaced relation to the edge of the lens, said shoe being arcuate on its inner side with a curvature of less radius than that of the perimeter of the lens, and an arcuately-shaped spring having a less radius of curvature than the perimeter of the lens and inserted between the arcuate side of the shoe and the rim of the lens with the ends of the shoe bearing against the spring adjacent its ends to clamp the terminal portions of the spring against the edge of the lens to maintain the parts in rigid connection.

3. In an ophthalmic mounting for eyeglasses and spectacles, the combination with a lens, of a strap-member having perforated portions adapted to straddle the sides of the lens and provided with a rigid shoe spaced away from the edge of the lens with its ends at a less distance therefrom than its central portion, a screw inserted through the perforated portions of the strap-member and a hole in the lens to attach the mounting thereto, and a bow-shaped spring of less radius of curvature than the perimeter of the lens arranged between the rigid shoe and the rim of the lens with the ends of the shoe bearing against the back of the spring adjacent the ends of the latter to cause the extremities of the spring to bind against the edge of the lens to maintain the parts in rigid connection.

4. In an ophthalmic mounting for rimless eyeglasses and spectacles, the combination with a lens, of a strap-member having perforated portions straddling the sides of the lens, a screw inserted through the perforations in the strap-member and a hole in the lens, said strap-member having a rigid shoe arranged opposite the edge of the lens with its ends at a less distance from the edge of the lens than its central portion, and a bow-shaped spring of greater length than the shoe and less radius of curvature than the perimeter of the lens, said spring secured to the strap-member at its central portion with the ends of the shoe bearing against its outer side adjacent the ends of the spring to maintain the latter under compression with its terminal portions frictionally engaging the edge of the lens to secure the parts in rigid connection.

In testimony whereof I hereunto affix my signature.

BROR J. JACOBSON.